United States Patent [19]

Levy et al.

[11] Patent Number: 5,375,469
[45] Date of Patent: Dec. 27, 1994

[54] CAPACITIVE ACCELERATION SENSOR AND ITS APPLICATION IN A NON-SERVOED ACCELEROMETER

[75] Inventors: Michel Levy, Cergy; Alfred Permuy, Paris, both of France

[73] Assignee: Societe d'Applications Generales d'Electricite et de Mecanique SAGEM, France

[21] Appl. No.: 31,392

[22] Filed: Mar. 9, 1993

[30] Foreign Application Priority Data

Mar. 9, 1992 [FR] France ................... 92 02782

[51] Int. Cl.⁵ ................................. G01P 15/125
[52] U.S. Cl. .................... 73/517 B; 73/517 R
[58] Field of Search ............... 73/517 R, 517 B; 324/725, 690, 660, 661, 680

[56] References Cited

U.S. PATENT DOCUMENTS

| | | | |
|---|---|---|---|
| 3,012,192 | 12/1961 | Lion | 324/680 X |
| 3,464,004 | 8/1969 | Nobis | 324/725 X |
| 4,356,730 | 11/1982 | Cade | 73/517 |
| 4,483,194 | 11/1984 | Rudolf | 73/517 R |
| 4,543,526 | 9/1985 | Burckhardt et al. | 324/725 |

*Primary Examiner*—Herbert Goldstein
*Assistant Examiner*—Joseph L. Felber
*Attorney, Agent, or Firm*—Larson and Taylor

[57] ABSTRACT

The miniaturizable sensor comprises an insulating substrate (10) supporting a first measurement electrode (24) and comprising a flexible measurement arm (18) of conductive or semiconductor material, one end of which is secured to the substrate (10) and the other end of which constitutes a second electrode facing the first electrode. The first end of the measurement arm is secured to the substrate via a beam (16) having a bending modulus at least ten times greater than that of the measurement arm (18) and substantially parallel to the measurement arm and via a foot (14) rigidly secured to the substrate (10) and situated between the two ends of the measurement arm, the connections of the beam (16) to the measurement arm (18) and to the foot (14) being of the fixed-end type.

7 Claims, 2 Drawing Sheets

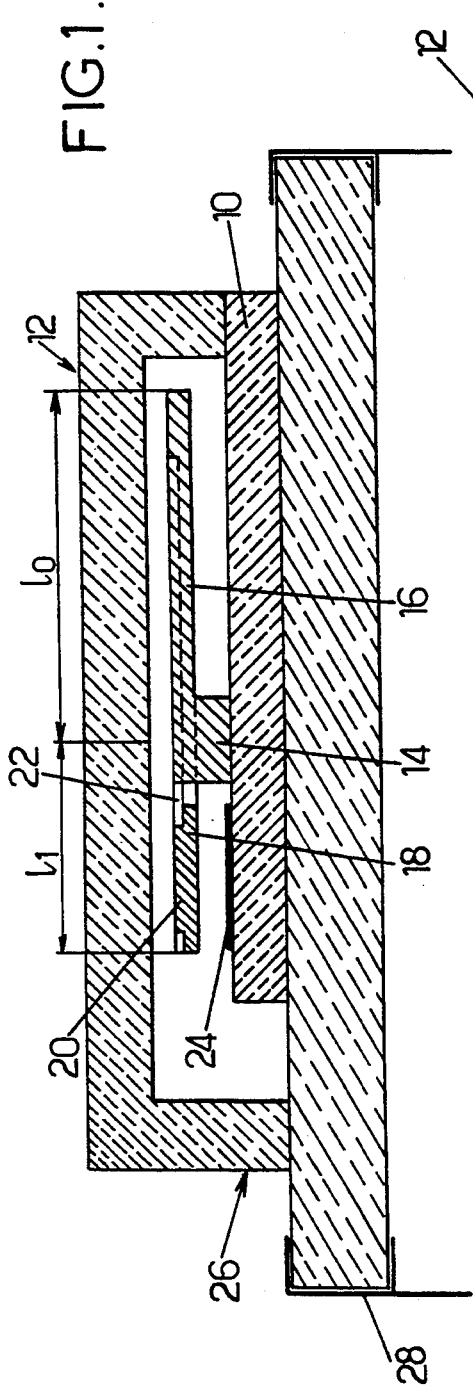
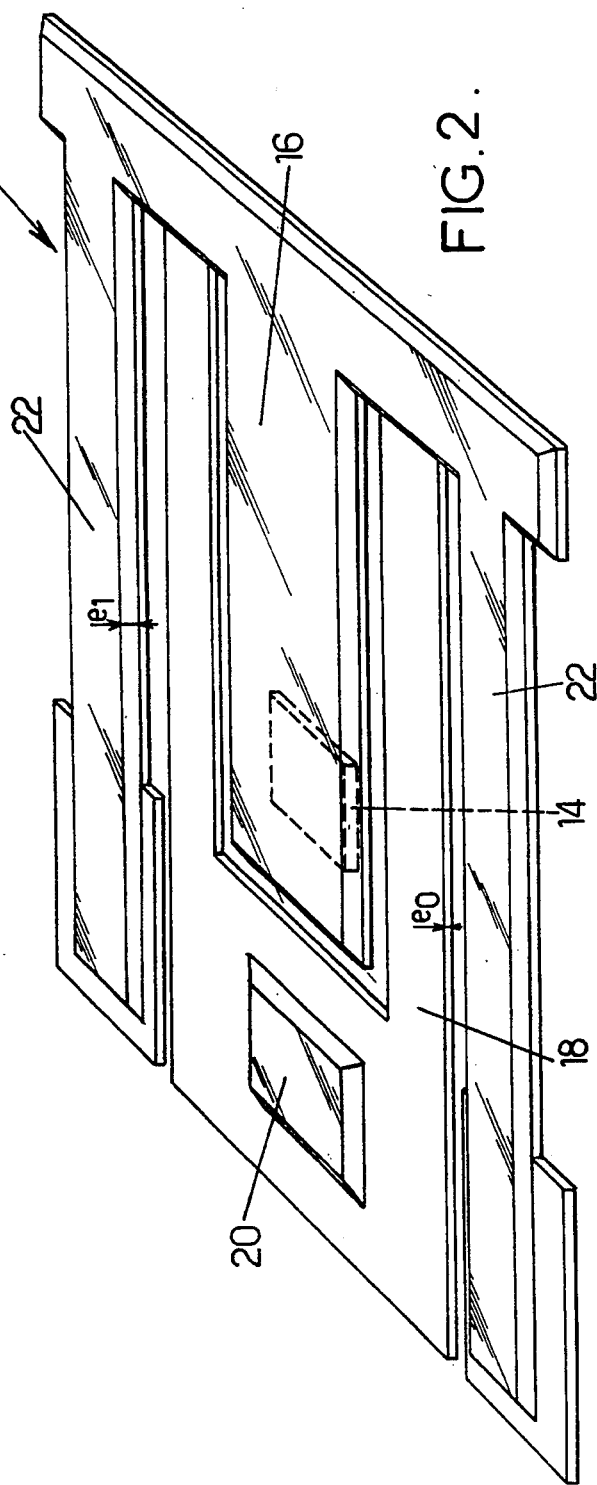

FIG.3.
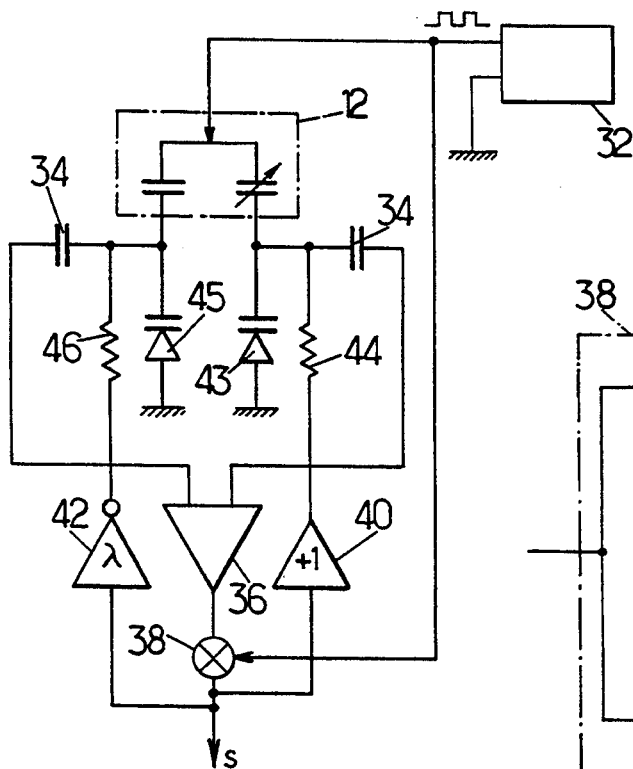
FIG.4.
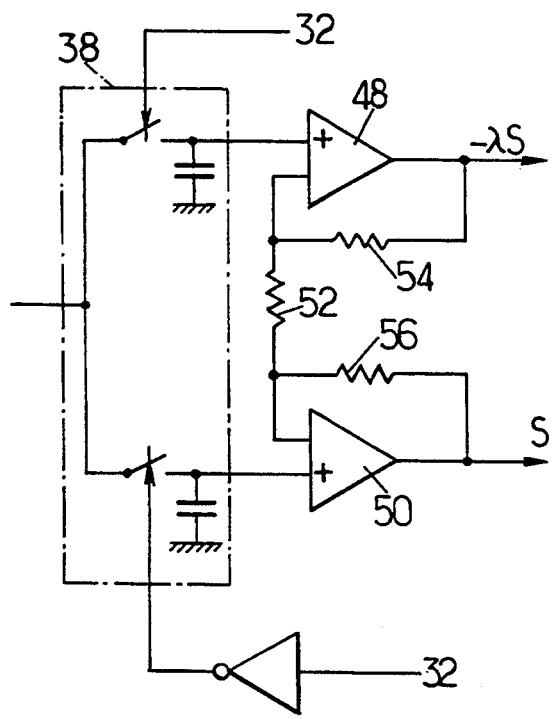
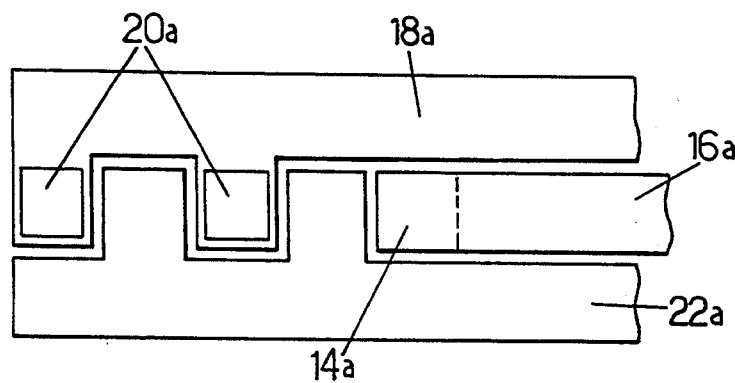
FIG.5.

CAPACITIVE ACCELERATION SENSOR AND ITS APPLICATION IN A NON-SERVOED ACCELEROMETER

BACKGROUND OF THE INVENTION

The invention relates to capacitive acceleration sensors capable of being implemented in a small volume and is particularly applicable in all areas of industry where the use of low cost miniature sensors is necessary.

The invention relates particularly to sensors of the type comprising an insulating substrate supporting a first measurement electrode and comprising a flexible measurement arm of semiconductor material, one end of which is secured to the substrate and the other end of which constitutes a second electrode facing the first electrode, flexibility of the arm allowing the second electrode to be displaced towards and away from the substrate in response to acceleration in a direction transverse to the electrodes.

Such sensors are known in which the first end of the flexible arm is enlarged and secured to the substrate by, for example, soldering. The difference in thermal expansion between the substrate, which is usually constituted by a metal oxide such as alumina, and the arm, constituted for example by silicon, causes modification in the rest angle of the arm relative to the substrate and therefore in the capacitance of the capacitor formed by the electrodes. It is difficult to compensate precisely for this zero shift.

SUMMARY OF THE INVENTION

In an acceleration sensor according to the invention, the first end of the measurement arm is secured to the substrate via a beam which has bending strength at least ten times greater than that of the measurement arm and which is substantially parallel to the measurement arm, and via a foot rigidly secured to the substrate and situated between the two ends of the measurement arm, the connections of the beam to the measurement arm and to the foot being of fixed-end type.

To reduce the residual error still further, the beam is also secured to a reference arm which is parallel to and of the same length as the measurement arm, but which has a bending modulus at least ten times that of the measurement arm, the reference arm facing a reference electrode of substantially the same surface area as the measurement capacitor.

By measuring acceleration by comparing the measurement capacitor and the reference capacitor constituted by the reference electrode and reference arm, the temperature dependent zero error can be virtually eliminated. Only the sensitivity of the sensor will vary with temperature.

The invention also proposes an accelerometer having a sensor of the type defined above placed in a bridge circuit, one diagonal of which is supplied with an alternating periodic signal, the accelerometer also comprising means for amplifying the alternating differential voltage which appears across the other diagonal of the bridge, synchronous demodulation means, and means for re-injecting two rebalancing d.c. voltages into the measuring diagonal.

The output voltage thereby obtained is a linear function of acceleration for small deformations.

Other relative configurations of the measuring and reference arms may be used. In particular, one of the two arms may be in the shape of a fork which surrounds the other. Alternatively, the two arms may terminate in transverse fingers which are interleaved. Advantageously, to improve the symmetry of the sensor, the measuring arm carries a mass which may be constituted by local thickening or by added heavy material.

BRIEF DESCRIPTION OF THE DRAWINGS

FIG. 1 is a diagram showing the principle of a sensor according to one embodiment of the invention, shown in section along a central plane perpendicular to the substrate;

FIG. 2 is a perspective view of a portion of the sensor of FIG. 1 without the substrate;

FIG. 3 shows a possible construction of an accelerometer using a sensor of the type shown in FIG. 1 or 2;

FIG. 4 shows a possible arrangement of the demodulator and the linearization loops of the accelerometer of FIG. 3; and FIG. 5 shows a schematic view from above of another possible construction of the arms of a sensor according to the invention.

DETAILED DESCRIPTION OF THE INVENTION

FIGS. 1 and 2, which for clarity are not to scale, show a possible construction of a sensor according to the invention. The sensor comprises an insulating substrate 10, for example of alumina of the type used for supporting thin film circuits, and an add-on assembly 12, at least the surface of which is of conductive material such as doped silicon. Assembly 12 is monolithic. It may be produced by photoetching using well known microelectronic techniques. Assembly 12 comprises a foot 14 secured to the substrate by chromium, nickel or gold deposits which form a eutectic on the substrate with the silicon. A beam 16 extending from the foot is arranged to be substantially parallel to the substrate and of sufficient length and thickness so as to suffer negligible deformation over the range of accelerations to be measured. A measuring arm 18 extends from the beam towards and beyond the foot 14, the arm shown in FIGS. 1 and 2 being U-shaped and surrounding the beam 16. Arm 18 is thinner than the beam and its thickness $e_0$ is chosen so that the arm deflects significantly in response to accelerations experienced across its thickness $e_0$. In practice, for accelerations encountered in applications such as automobiles, the length of arm 18 may be of the order of one centimeter and its thickness of the order of 30 $\mu$m. Advantageously, the end of arm 18 at the base of the U may be formed with a thicker portion to constitute a mass 20 to increase its sensitivity. A distance of about 30 $\mu$m may be chosen between the end of arm 18 and an electrode 24 deposited on the substrate. The ratio of the difference $l_1$ between the lengths of arm 18 and beam 16 and the length $l_0$ of beam 16 may be between one quarter and one half.

The sensor shown in FIGS. 1 and 2 also comprises a double reference arm 22 situated parallel to arm 18 and of substantially the same length. Arm 22 may be considered as a fork surrounding both the beam 16 and the arm 18. The thickness $e_1$ of the reference arm 22 is distinctly greater than the thickness $e_0$ of the measurement arm, so that its bending deformations are negligible relative to those of the measurement arm. In practice, reference arm 22 has a bending modulus at least 10 times and generally at least 100 times greater than that of arm 18

(this being achieved by using 10 times the thickness). The end of arm 22 constitutes a capacitor electrode which faces a second electrode, not shown, formed by a conductive deposit on substrate 10. Advantageously, electrode 24 and the assembly of electrodes cooperating with reference arm 22 have equal surface areas so that the two capacitors thus formed have equal capacitances when at rest.

The sensor thus formed may be placed in a protective enclosure 26, which may be evacuated to increase its Q factor. It is preferable however to leave some gas in the enclosure to give viscous damping so as to avoid sensor resonance. The electrodes may be connected via conductive tracks 28 to pins which emerge from the enclosure. Preferably however, the circuit which measures the imbalance between the capacitors and which produces a signal representative of acceleration may be situated inside the enclosure, for example in the form of a hybrid circuit carried on the substrate 10.

In particular, the electronic circuit may be arranged as shown schematically in FIG. 3. The two capacitors constituted by assembly 12 are associated with two variable capacitance diodes 43, 45 to form a capacitive bridge circuit, one diagonal of which is supplied with a periodic signal from a generator 32. The alternating component appearing across the other bridge diagonal is taken off via respective capacitors 34 and is applied to a differential amplifier 36. A synchronous demodulator 38 provides an output signal s representing acceleration, provided the temperature varies little and the deformations are sufficiently small as to remain in the linear response region.

A circuit limited to the above-mentioned components produces a signal s proportional to the imbalance of the bridge, but which does not vary linearly with acceleration. This signal may be linearized by the addition of downstream circuits using a calibration curve. However, it is more convenient to linearize the response by bridge rebalancing loops, feeding back appropriate d.c. voltages to the ends of the measuring diagonal, these being derived from the output of the synchronous modulator. These loops are shown in FIG. 3 as amplifiers 40 or 42 followed by resistors 44 or 46. If amplifier 40 has a gain of 1, amplifier 42 has a gain of $-\lambda$. The value of $\lambda$ may be determined by analyzing the non-linearities which may affect the response. These may arise because the capacitance of the capacitor is inversely proportional to acceleration, or due to the capacitance/voltage characteristics of the diodes 43, 45. For small deformations, the output signal s may be expressed as a limited expansion which is a function of acceleration. If the circuit of FIG. 3 is used, the gain appears in the expression of the coefficients of this limited expansion, as far as that gain $\lambda$ affects the capacitances of the diodes 43, 45. Thus the value of $\lambda$ is chosen so as to cancel the second order coefficient which gives a quasi-linear accelerometer response.

In practice, the rebalancing and linearization loops may be arranged as shown in FIG. 4. In that figure, the switches and capacitors contained within the chain-dotted box 38 represent the synchronous demodulator of FIG. 3. The demodulated signals are applied to the non-inverting inputs of two differential amplifiers 48 and 50, the inverting inputs of which are connected via a resistor 52. Feedback resistors 54 and 56 of differential amplifiers 48 and 50 are proportional to the gains which are required. In practice, feedback resistor 54 is often approximately half the resistance of feedback resistor 56. The output signals S and $-\lambda S$ are fed to the ends of the measuring diagonal to control the capacitances of diodes 43, 45.

Many variations on the invention are possible. In particular, the measurement and reference arms may have a different relative disposition to that described. In FIG. 5, where elements corresponding to those in FIG. 2 carry the same reference number with subscript a, the measuring arm 18a and the reference arm 22a are situated on either side of the beam 16a. One end of each arm is connected to the beam by a fixed-end or "encastre" connection via a transverse bar, the opposite ends of the arms being provided with transverse fingers which are interleaved. The transverse fingers of arm 18a carry respective additional masses 20a. The substrate (not shown) carries electrodes, one electrode constituting a capacitor with the reference arm and the other electrode constituting a capacitor with the measuring arm. As in the previous example, the electrodes which cooperate with the two arms have the same surface area. The flexibility of the measuring arm is again distinctly greater than that of the reference arm. In practice, its bending modulus will be generally about one hundred times smaller, which is achieved by a ratio of about ten between the thicknesses.

We claim:

1. A capacitive acceleration sensor comprising an insulating substrate having a surface with a first measurement electrode supported thereon, and comprising a flexible measurement arm of conductive or semiconductor material, having a first end portion secured to the substrate and a second end portion forming a second measurement electrode facing the first measurement electrode, wherein flexibility of the arm allows the second measurement electrode to be displaced towards and away from the substrate in response to acceleration in a direction transverse to said surface of the substrate, wherein said first end portion is secured to the substrate via a beam having a bending modulus at least ten times greater than that of the measurement arm and substantially parallel to the measurement arm, and via a foot rigidly secured to the substrate and situated between the two end portions of the measurement arm, the connections of the beam to the measurement arm and to the foot being of fixed-end type, and wherein the beam is also secured to a reference arm which is parallel to and of the same length as the measurement arm, but which has a bending modulus at least 10 times that of the measurement arm, the reference arm facing a reference electrode of the same surface area as that of the first measurement electrode.

2. A sensor according to claim 1, wherein the measurement arm is in the shape of a U, the base of which carries an additional mass.

3. A sensor according to claim 1, wherein at least one of the arms is in the shape of a fork and surrounds the beam.

4. A sensor according to claim 1, wherein the reference arm is in the shape of a fork and surrounds the beam and the measurement arm.

5. A sensor according to the claim 3, wherein the measurement arm and the reference arm comprise, at their ends which are not fixed, transverse fingers which are interleaved and which cooperate with respective electrodes formed on the substrate.

6. An accelerometer including a sensor comprising an insulating substrate having a surface with a first measurement electrode supported thereon and comprising a flexible measurement arm of conductive or semiconductor material, having a first end portion secured to the substrate and a second end portion forming a second measurement electrode facing the first measurement electrode, wherein flexibility of the arm allows the second measurement electrode to be displaced towards and away from the substrate in response to acceleration in a direction transverse to said surface of the substrate, wherein said first end portion is secured to the substrate via a beam having a bending modulus at least en times greater than that of the measurement arm and substantially parallel to the measurement arm, and via a foot rigidly secured to the substrate and simulated between the two end portions of the measurement arm, the connections of the beam to the measurement arm and to the foot being of fixed-end type, wherein the beam is also secured to a reference arm which is parallel to and of the same length as the measurement arm, but which has a bending modulus at least 10 times that of the measurement arm, the reference arm facing a reference electrode of the same surface area as that of the first measurement electrode, and wherein capacitors constituted by the measurement and reference arms are placed in a bridge circuit, having a measuring diagonal which is supplied with an alternating periodic signal, the accelerometer further including means for amplifying the alternating differential voltage which appears across the other diagonal of the bridge, synchronous demodulation means, and means for reinjecting two rebalancing d.c. voltages into the measuring diagonal.

7. An accelerometer according to claim 6, wherein the bridge circuit comprises, in addition to the capacitors constituted by the measurement and reference arms, two diodes having respective capacitances controlled by the rebalancing d.c. voltages so that the output signal of the synchronous demodulation means is a substantially linear function of the measured acceleration.

* * * * *